United States Patent [19]

La Belle

[11] Patent Number: 5,385,042
[45] Date of Patent: Jan. 31, 1995

[54] DYNAMOMETER AND METHOD FOR SIMULATING VEHICLE ROAD LOAD AND/OR INERTIAL FORCES WHILE PROVIDING COMPENSATION FOR THE PARASITIC LOSSES OF THE DYNAMOMETER

[75] Inventor: John T. La Belle, Long Beach, Calif.

[73] Assignee: Clayton Industries, El Monte, Calif.

[21] Appl. No.: 932,958

[22] Filed: Aug. 21, 1992

[51] Int. Cl.$^6$ .............................................. G01L 5/13
[52] U.S. Cl. ..................................... 73/117; 73/862.18
[58] Field of Search ................. 73/117, 862.17, 862.18; 318/760

[56] References Cited

U.S. PATENT DOCUMENTS

| | | | |
|---|---|---|---|
| 3,017,553 | 1/1962 | Homan | 318/760 X |
| 3,955,410 | 5/1976 | Wakabayashi et al. | 73/862.18 |
| 4,161,116 | 7/1979 | Fegraus et al. | 73/117 |
| 5,101,660 | 4/1992 | La Belle | 73/117 |

OTHER PUBLICATIONS

Severino D'Angelo And R. D. Gafford "Advantages of Using Microcomputers in Dynamometer Controllers" 1981; SAE Technical Paper No. 810749.
Arthur L. Cook and Clifford C. Carr "Elements of Electrical Engineering" 1924 6th Edition; Library of Congress Card No. 53-11045.
Severino D'Angels and R. D. Gafford "Feed-Forward Dynamometer Controller for High Speed Inertia Simulation 1981"; SAE Technical Paper No. 810749.

Primary Examiner—Hezron E. Williams
Assistant Examiner—James M. Olsen
Attorney, Agent, or Firm—Harold L. Jackson

[57] ABSTRACT

A dynamometer for testing engine powered vehicles including an induction motor coupled directly to the vehicle engine or the driven wheels thereof. A computer in response to the engine or wheel speed and the torque applied to or received from the engine or wheels by the motor provides a desired torque signal to a motor power controller to similate the road load and/or vehicle inertial forces encountered by the vehicle during actual operation and to compensate for the parasitic losses of the dynamometer. The motor power controller in turn applies a d.c. voltage to the motor when the desired torque signal is negative to cause the motor to absorb power from the engine or driven wheels and applies an a.c. voltage to the motor when the desired torque signal is positive to cause the motor to supply power to the engine or driven wheels in accordance with the parasitic losses and the road load and/or inertial forces to be simulated by the induction motor.

31 Claims, 7 Drawing Sheets

DYNAMOMETER AND METHOD FOR SIMULATING VEHICLE ROAD LOAD AND/OR INERTIAL FORCES WHILE PROVIDING COMPENSATION FOR THE PARASITIC LOSSES OF THE DYNAMOMETER

BACKGROUND OF THE INVENTION

1. Field of the Invention

This invention relates to dynamometers which compensate for parasitic losses while simulating those forces (road load and inertial) which the vehicle would incur during actual operation on the road.

2. Description of the Prior Art

Test apparatus in the form of dynamometers is widely used for testing motor vehicles in place. Since the test vehicles are not moving over a road bed, the dynamometer must simulate certain forces normally associated with actual vehicle operation. These parameters include forces associated with inertia (related to the mass or weight of the vehicle) and road load forces (related to the velocity of the vehicle). The vehicle engine (or its braking system) must overcome inertial forces in order to accelerate or decelerate the vehicle. In addition, the engine must overcome breakaway frictional and rolling frictional forces (i.e., road/tire friction) as well as windage forces (i.e., drag forces caused by air passing over the vehicle). These latter forces are commonly referred to as road load (RL) forces and may be represented by the formula:

$$RL = A + BV + CV^2 + DV^3 + EW \qquad (1)$$

where A represents the effects of breakaway force, and B, C and D represent the effects of rolling friction and windage, V represents the vehicle velocity, E represents the grade of the slope and W represents the vehicle weight.

Dynamometers generally include a roll or pair of rolls for engaging the driven wheels of the vehicles. However, dynamometers can be coupled directly to a vehicle engine thereby eliminating the need for the roll or rolls. A power supplying and absorbing unit, typically a d.c. motor, or a power absorbing unit such as a friction brake, eddy current brake or hydrokinetic brake is coupled to the roll or rolls (or directly to the engine) for supplying power to and/or absorbing power from the roll(s) which in turn applies a retarding force to the surface of the vehicle wheels (e.g., tires) to simulate the road load forces. Inertial forces can be simulated by power supplying and absorbing units during both acceleration and deceleration but can be simulated by power absorbing units only during acceleration. Mechanical flywheels are generally used in conjunction with power supplying and/or absorbing units to simulate a part (or in some instances all) of the vehicle inertia.

Where mechanical flywheels are used to simulate all of the test vehicle's inertia, the power supplying and/or absorbing unit need only supply torque to the roll(s) and compensate for parasitic losses within the dynamometer and to satisfy the roll/wheel interface force dedicated by the road load equation. Where the unit is to simulate all or part of the vehicle's inertia in addition to road load and parasitic loss forces one of the following equations may be implemented:

$$Vd = \int_o^t \frac{(F + P_L) - RL}{I} dt \qquad (2)$$

where
Vd = the desired velocity of the driven roll(s),
F = the measured force at the wheel/roll interface,
$P_L$ = the parasitic losses associated with the dynamometer,
RL = the road load force, and
I = the desired vehicle inertia, or $$F_d = I \text{ (or mass)} \frac{dV}{dt} + RL - P_L \qquad (3)$$

where
where $F_d$ = the desired wheel/roll interference force, and
V = the measured velocity of the driven roll.

The rotational velocity of the roll is representative of V and can be accurately measured by coupling a speed encoder of the optical or magnetic pulse type to the dynamometer roll. However, there is no force measuring device which as a practical matter, can be placed between the rotating vehicle wheel and the roll. As a compromise, a force measuring device or transducer is generally placed either at the output of the power supplying and/or absorbing unit or between the flywheel assembly and the shaft connecting the flywheels to the roll. In either case, there are bearing friction and windage losses generated by the roll and/or flywheels and perhaps losses caused by the bending action of flexible belts which are not measured by the transducer. Such losses are commonly referred to as parasitic losses (PL) and must be compensated for in order to provide an accurate control signal for the power supplying and/or absorbing unit in the dynamometer as will be explained in more detail.

Basic equation (2) above can be implemented by integrating the measured force F (or torque) signal to compute the desired speed signal, comparing the computed speed signal with the measured speed signal to provide an error speed signal and controlling the power supplying/absorbing unit to reduce the error signal to zero as is explained in some detail in U.S. Pat. No. 4,101,116 assigned to the assignee of this application.

Equation (3) can be implemented by differentiating the measured speed signal V to provide a desired force (or torque) signal, comparing the desired force (or torque) signal with the measured force (or torque) signal to provide an error force signal and controlling the power supplying/absorbing unit to reduce the error signal to zero. A variation of the above techniques can also be used to provide an appropriate control signal to the power supplying/absorbing unit as is explained, for example, in an SAE Technical Paper Article No. 810749 (1981) entitled *Feed-Forward Dynamometer Controller for High Speed Inertia Simulation* by Severino D'Angleo and R. D. Gafford.

A parasitic loss profile or curve of the lost force at the roll surface (due to parasitic losses) versus roll speed for the roll can be computed by measuring the force required to maintain the roll or rolls at several selected (e.g., three) speeds. Such a loss profile can also be calculated by using the actual inertia of the roll system and allowing the roll (or rolls) to coast down from a high speed while measuring the change of roll speed at selected points on the speed curve. The parasitic loss profile can be represented by the equation:

$$PL = F + GV + HV^2 \qquad (4)$$

where

PL=the parasitic loss torque to be supplied or absorbed by the power supplying/absorbing unit at a given speed and F, G, and H are constants that define the magnitude and curvature of the profile.

Since the parasitic losses vary with environmental conditions such as temperature, it is prudent to measure the losses periodically e.g., several times during each day that the dynamometer is in operation. A power supplying and absorbing unit may provide the motoring power to operate the dynamometer periodically between testing intervals for this purpose. A separate motor must be used for this purpose where the unit for absorbing power from the roll(s) is incapable of supplying power e.g., an eddy current brake, friction brake or a hydrokinetic absorber. The use of a separate motor adds to the cost and complexity of the dynamometer.

A d.c. motor would appear to be ideally suited and has been widely used for accomplishing both tasks i.e., operating the dynamometer during vehicle tests and during parasitic loss measurements. However, d.c. motors of a sufficient size for accomplishing these tasks are very expensive. While a.c. motors, such as synchronous and induction motors, are less expensive (particularly induction motors), they are not as easily controlled with respect to speed and absorption characteristics. To change the speed of a synchronous motor, the frequency of the input stator voltage must be changed. While an induction motor can operate over a wide speed range with a fixed frequency input voltage, the motoring output torque will vary with the slip frequency. The motor will perform as a generator and thus absorb torque only when the rotor revolves at a speed greater than the rotating stator field i.e., greater than the synchronous speed. Systems which vary the synchronous frequency and magnitude of the stator voltage of induction motors are often referred to as vector drive systems. While such systems enable an induction motor to operate in a motoring and absorbing mode over a wide speed range, they require the conventional a.c. line voltage to be converted to d.c. and then back to a.c. at a different frequency and thus are complex and expensive.

It has been suggested that an induction motor could be used to produce a braking action for lowering loads in a crane hoist at a speed less than the synchronous speed by exciting the stator windings with direct current and consuming the power produced in a resistance. See Chapter 26 of the textbook *Elements of Electrical Engineering* by Arthur L. Cook and Clifford C. Carr, 6th Edition, published and copyrighted in 1924 by John Wiley and Sons, Inc., Library of Congress card no. 53-11045. However, the problems involved in virtually instantaneously changing the power absorption characteristics of a dynamometer with speed are not comparable to those involved in lowering a given weight at a safe speed as in a crane hoist.

There is a need for a less expensive dynamometer which is capable of simulating motor vehicle road load and/or inertia forces while providing parasitic loss compensation.

SUMMARY OF THE INVENTION

A dynamometer for testing engine powered vehicles in accordance with the present invention includes an induction motor and means for coupling the motor directly to the vehicle engine or to the driven wheel(s) of the vehicle. A speed sensor provides a measured speed signal representative of the engine or wheel speed. A force sensor provides a measured force signal representative of the force applied to or received from the engine or driven wheel(s) of the vehicle minus the force attributable to the parasitic losses. A computer or processor provides first and second desired torque signals. The first signal is representative of the torque desired to be applied to or received from the engine or roll by the induction motor to simulate the road load and/or inertial forces which will be encountered by the vehicle during the actual operation and to compensate for the parasitic loss forces of the dynamometer. The second signal is representative of at least one and preferably three separate speeds at which the dynamometer is to be driven in the absence of a test vehicle for the measurement of parasitic losses. The dynamometer includes a source of a.c. and d.c. voltage. Stator power control means are connected between the stator of the induction motor and the a.c. and d.c. voltage sources and responsive to the first desired torque signals for applying d.c. voltage to the stator so that the motor will operate to supply power (where signal is positive) and absorb power (when the signal is negative) to the engine or roll in accordance with the parasitic losses and the road load and/or inertial forces to be simulated by the induction motor and to the second desired torque signal applying a.c. voltage to the stator to cause the motor to drive the engine or roll at the selected parasitic loss measurement test speed or speeds.

The features of the present invention can best be understood by reference to the following description taken in conjunction with the accompanying drawings wherein like reference numerals designate like components.

DESCRIPTION OF THE PREFERRED EMBODIMENT

Figure 1:
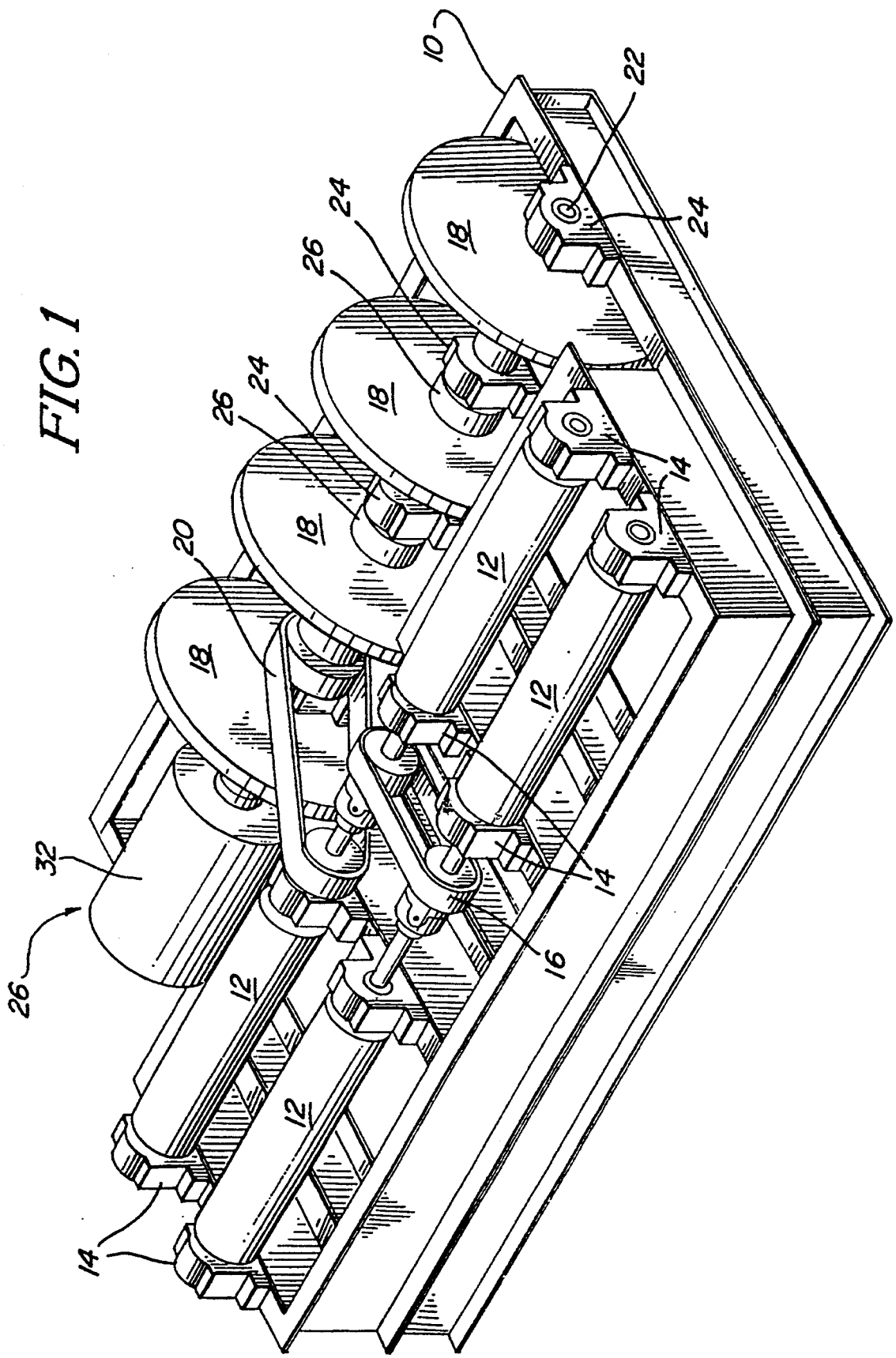
FIG. 1 is a perspective view of a dynamometer in accordance with this invention illustrating a typical roll and flywheel assembly to which an induction motor is connected.

Referring now to the drawings and particularly to FIG. 1, the chassis dynamometer of this invention includes a frame 10 which is preferably mounted below the floor level of the testing facility with the vehicle wheel engaging rolls 12 thereof arranged to engage the driven (front or rear) wheels of the vehicles to be tested. The rolls are carried by shafts which are received in bearing blocks 14. The rolls 12 are coupled together via flexible belt 16 and to mechanical flywheels 18 via belt 20. The flywheels are rotatably mounted on a shaft 22 which in turn is rotatably mounted on the frame 10 by bearing blocks 24. Conventional clutches 26 allow one or more of the flywheels to be coupled to and rotate with the shaft 22.

An induction motor 26 includes a stator 28 and a rotor 30 (not shown in FIG. 1). The rotor is connected to the shaft 22 to apply a motoring or braking torque thereto. The stator 28 is mounted within a housing 32 which is pivotally mounted to the frame 10 so that a conventional torque transducer 34 (not shown in FIG. 1) may be coupled between the motor housing 30 and the frame to provide a measured torque (or force) signal representative of the torque (or force) supplied to or received from the vehicle wheels by the rolls minus the torque (or force) attributable to parasitic losses of the dynamometer. The torque may also be measured by a transformer coupled in-line torque transducer disposed between the motor shaft or the roll set and the remaining portion of the dynamometer. As a further alternative, the measured torque signal may be obtained by monitoring the certain motor parameters e.g., stator and/or rotor voltage or current. A conventional velocity encoder 36 (not shown in FIG. 1) is coupled to the rolls 12 (or to the rotor 30) for providing a measured speed signal representative of the roll (and vehicle wheel) speed.

Figure 2:
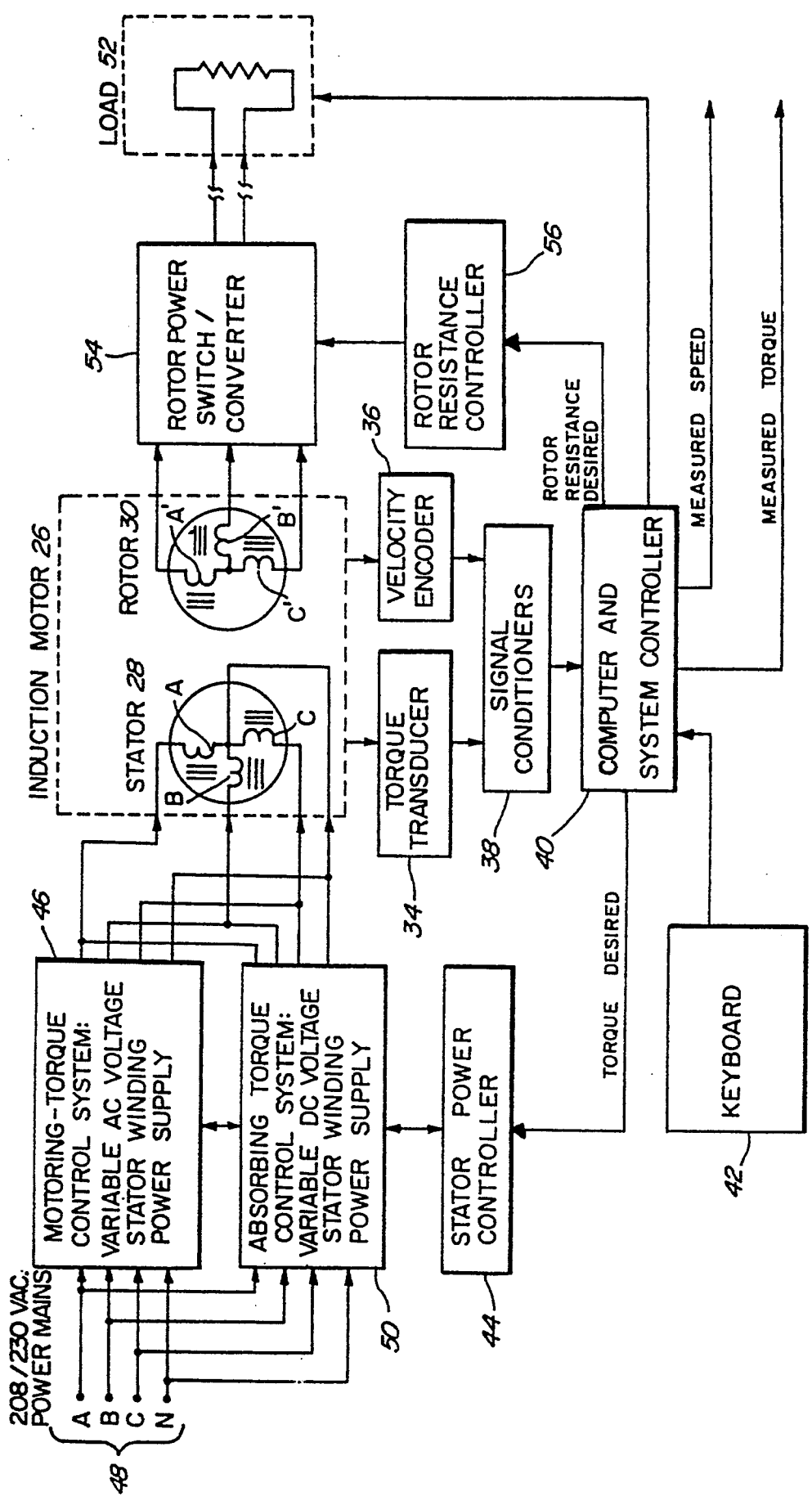
FIG. 2 is a diagrammatic view of a control system for a wound rotor induction motor for use in the dynamometer of FIG. 1.

Referring now to FIG. 2 the stator 28 is represented as three phase with phase windings A, B, and C connected in a Y configuration. Signals from the torque transducer 34 and speed encoder 36 are supplied to a computer and system controller 40 via a signal conditioning circuit 38 which may input the signals in digital format to the computer. A keyboard 42 is connected to the computer to allow an operator to input the road load (RL) force constants of equation (1) and if desired any or all of the inertia (or mass) of the vehicle to be tested which is to be simulated by the induction motor 26.

During a vehicle test sequence, the computer 40 in response to the measured torque and speed signal comoutes the desired torque or speed in accordance with equations (1), (2) or (3) and supplies a signal (first desired torque signal) representative of the desired motor torque to a stator power controller 44.

Prior to and periodically between vehicle tests the dynamometer can be operated (without a vehicle in place) to obtain the parasitic loss profile which is then stored (and updated) in the computer 40. The several speeds (or single speed with a coast down) at which the dynamometer is to be operated for parasitic loss measurements may also be inputted to the computer via the keyboard. During a parasitic loss measurement sequence, the computer supplies a second desired torque signal to the stator power controller 44 to drive the motor at the selected speed(s).

If the desired torque signal has a positive value, i.e., power is to be supplied to the rolls 12, the stator power controller 44 applies a signal to a motoring torque variable voltage control system 46 which applies an a.c. voltage (or current) of variable magnitude to the stator windings to drive the rotor so that its output torque matches the desired torque. The variable voltage a.c. supply 46 may comprise a simple switching circuit connected between the stator windings and a three phase 230 volt a.c. power main 48 represented by phase lines A, B, and C with a neutral line N. The desired torque signal will normally have a positive value during the measurement of parasitic losses and may also have a positive value at times during a vehicle test sequence.

If the desired torque signal has a negative value, i.e., power is to absorbed from the rolls 12, the stator power controller 44 applies a signal to an absorbing torque variable voltage control system 50 which applies a d.c. voltage (or current) of variable magnitude to the stator windings to apply a braking torque on the rotor which matches the desired torque. The variable voltage d.c. supply 50 may also comprise a simple switching circuit connected between the stator windings and the three phase power main 48.

Voltage of one polarity is applied to two of the rotor windings such as windings A and C and voltage of the opposite polarity is applied to the other winding such as the B winding. The resulting current flow through the A and C windings provides a stationary magnetic field opposite to that produced in the B winding.

The induction motor may be of the squirrel cage type, for example, of the high slip class D type to provide a relatively high starting torque, in which case all of the absorbed power is dissipated in the rotor. Preferably the motor is of the wound rotor type so that slip energy developed in the rotor windings during the absorption mode can be dissipated in an external load connected to the slip rings. In addition, the external rotor winding resistance can be controlled to provide good running performance and high starting torque for the motor.

Rotor 30 in FIG. 2, illustrated as a wound rotor type, is connected to an external load resistance 52 through a rotor power/switch converter 54. The computer 40 applies a signal representative of the rotor resistance desired to a rotor power controller 56 which in turn applies a signal to the switch/converter unit 54 to connect the rotor windings to a load which matches the desired rotor load resistance as will be explained in more detail. It should be noted that the external load 52 need not be a resistance element per se, but may be any load which effectively provides the desired rotor resistance.

Figure 3:
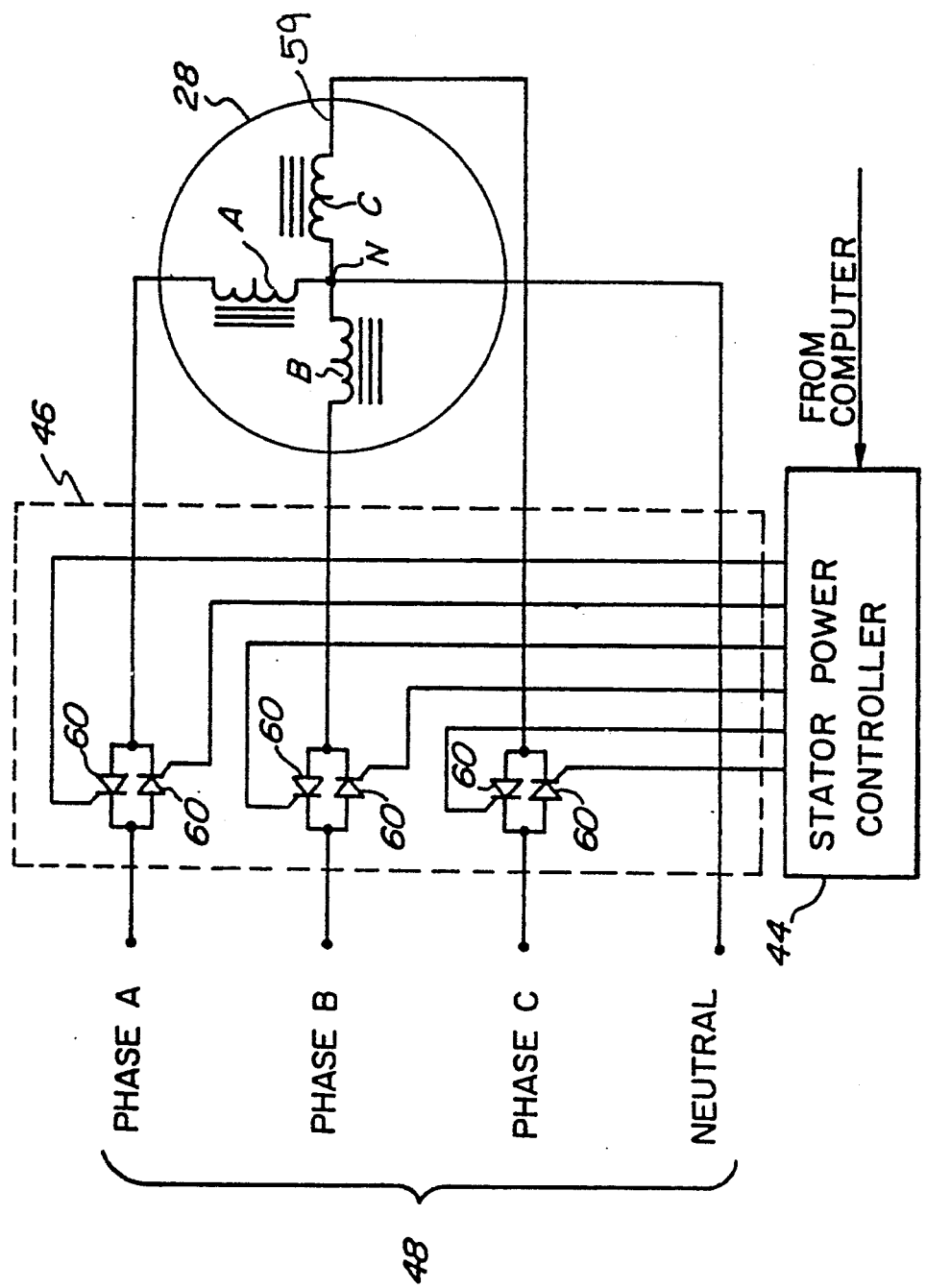
FIG. 3 is a schematic block diagram of an a.c. voltage power supply for the stator.
Figure 4:
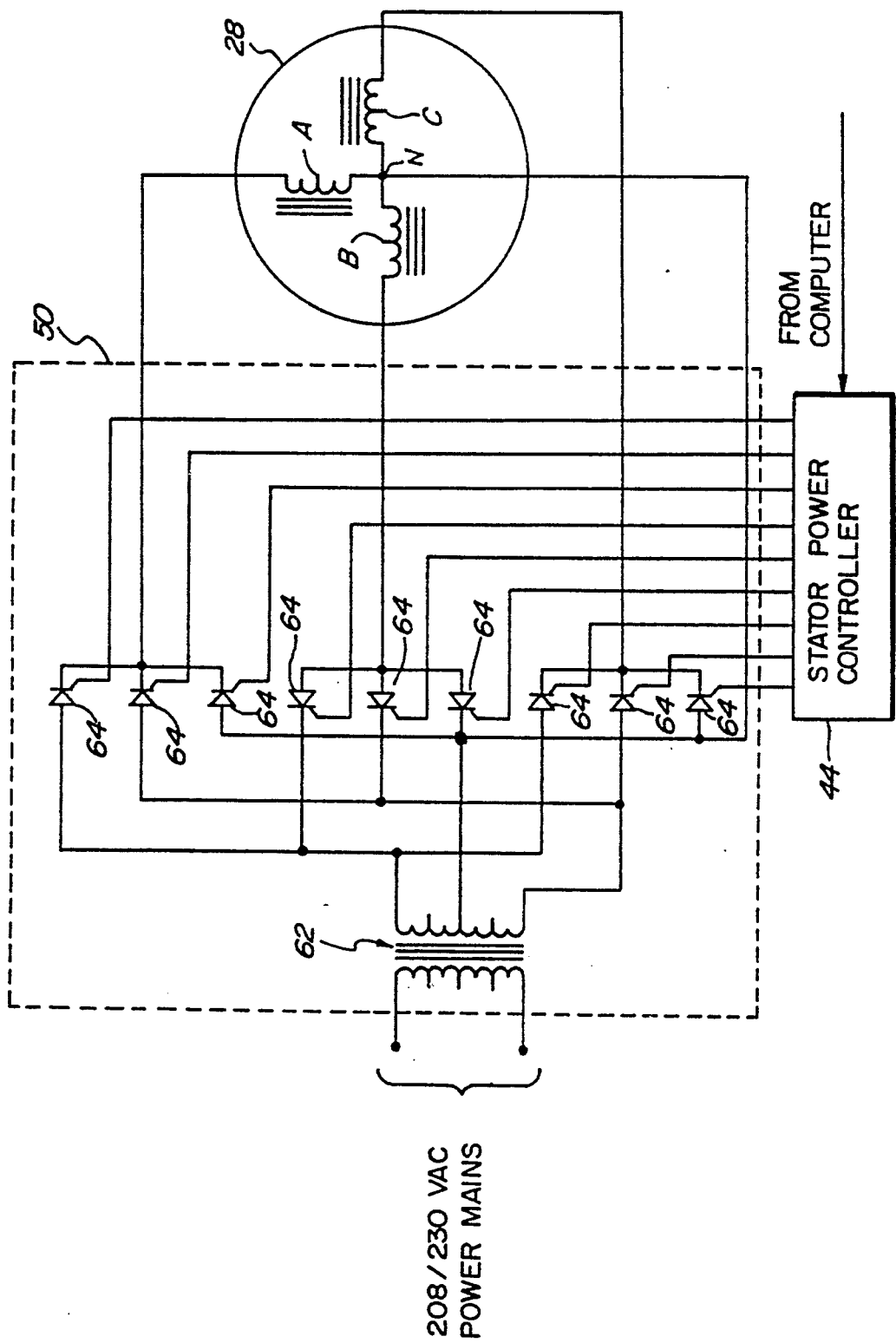
FIG. 4 is a schematic/block diagram of a d.c. voltage power supply for the stator.

One example of a variable a.c. voltage stator winding power supply is illustrated in FIG. 3. In this example, a pair of silicon controlled rectifiers ("SCRs") 60 are connected as shown between the terminal ends of the stator windings, A, B, C and the respective phases of the power mains 48 as shown. The neutral junction N is connected to the neutral terminal of the a.c. mains supply. The stator power controller applies appropriate signals to the gate electrodes of the SCRs to control the firing of the SCRs so that the appropriate portion of each half cycle of source current is supplied to the stator windings to match the rotor torque with the desired torque.

An example of a variable d.c. voltage stator winding power supply is illustrated in FIG. 3 wherein a transformer 62 has its primary winding connected across one phase of the power mains and a center taped secondary winding connected to the stator phase windings A, B and C via nine SCRs 64 as illustrated. The stator power controller applies firing signals to the SCRs 64 to supply rectified a.c. pulses during a portion of each cycle so that the braking torque applied by the rotor to the rolls 12 matches the desired torque. For a 30 h.p. wound rotor inductor motor, I have found that the output of the stator d.c. supply 50 may vary from 0 to 6 volts with the absorbed power approximating the 30 h.p. rating with 6 volts d.c. applied to the stator.

The response time for the dynamometer to transit from a motoring to an absorbing mode using SCRs as the switching elements is about one cycle since the current cut off point is the zero crossing of the waveform. The response time can be significantly improved by utilizing bipolar transistors where the added costs and lower current ratings can be justified.

Figure 5:
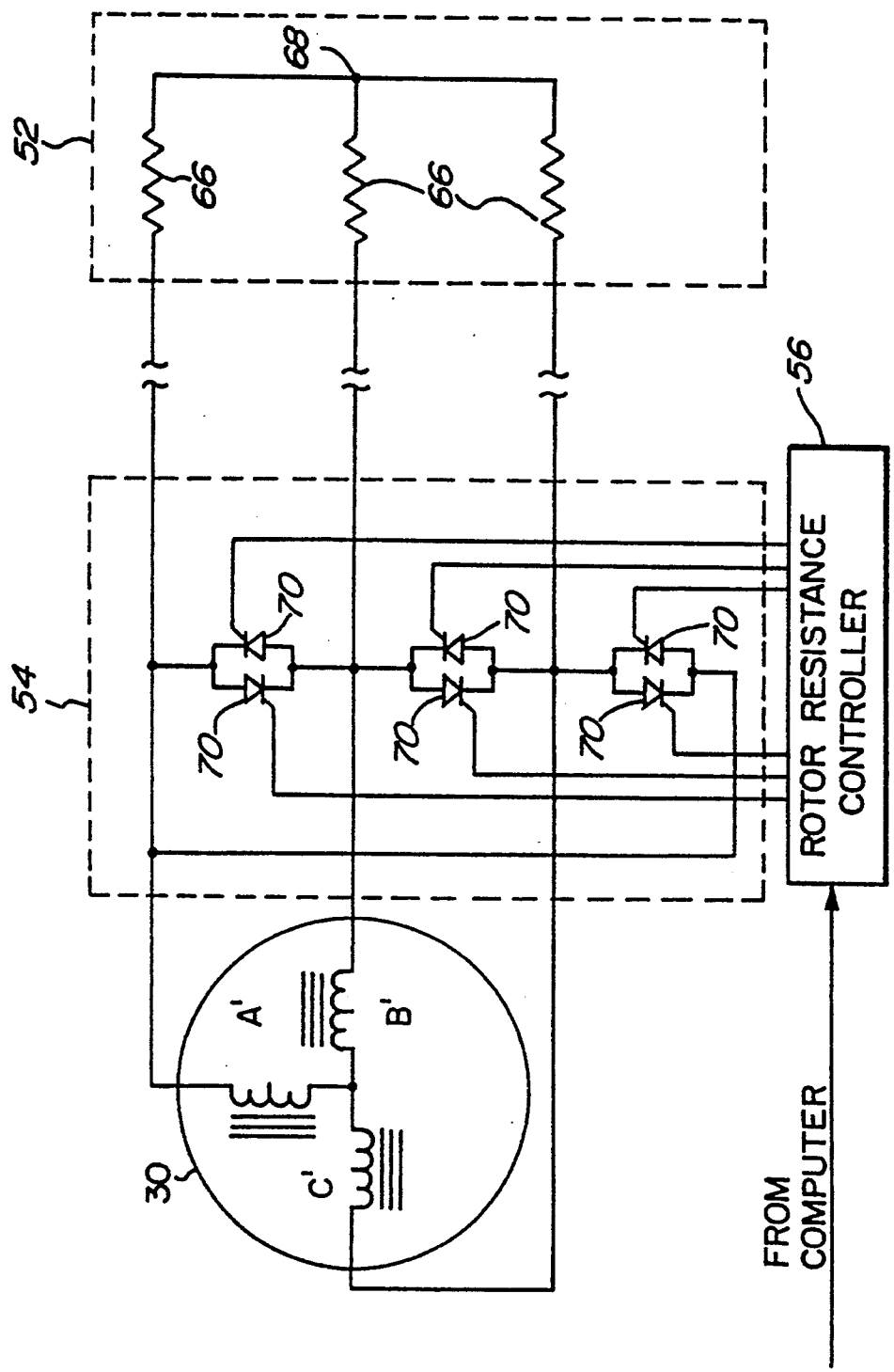
FIG. 5 is a schematic/block diagram of one rotor power load and switching system which may be used for controlling the absorbing or braking power developed in the motor.

Referring now to FIG. 5, there is illustrated an example of a rotor power converter and a resistance load for providing a variable resistance for the rotor windings of the induction motor.

The load 52 comprises a resistor of a selected value connected between respective terminal ends (slip rings) of each phase windings and a common terminal 68. The rotor power/switch converter comprises a pair of switching elements such as SCRs connected across the respective terminal ends of the phase windings, as illustrated, to short out the resistors when fired. The rotor resistance controller applies a signal to the SCR gate electrodes to fire the SCRs when the external rotor resistance is no longer called for i.e., above a predetermined roll (or rotor) speed.

This arrangement is simple (i.e. only two values of rotor resistance) in providing a good running performance near the synchronous speed while limiting the rotor current at stall and slow speed operation. The motor may be designed to provide a torque/speed curve similar to a class A or B squirrel cage motor when the resistors are short cirucited by the SCRs. When the resistors are in the circuit the motor may operate like a class D squirrel cage motor with the majority of the slip energy being dissipated externally of the rotor.

Another example of a system for controlling the value of the rotor resistance is illustrated in FIG. 3 in which six SCRs 72 are used to connect a single load resistor 74 across the rotor windings during all or a portion of each cycle of rotor current. An inductor 76 acts as a filter to prevent sharp rise times in the current waveform. A diode 78 protects the SCRs from inverse voltage spikes. In operation, the rotor resistance controller 56 in response to the rotor resistance desired signal from the computer controls the firing times of the SCRs 72 so that the average value of the resistance seen by the rotor windings matches the desired rotor resistance. The external rotor resistance can be made to vary from zero (SCRs not firing) to the total value of the resistor 74 (SCRS firing during each full cycle of rotor current). There is one disadvantage in using SCRs for varying the time that the load resistor is connected to the rotor windings i.e., the rotor currents are not sinusoidal and the resulting harmonics will be transformed back through the motor into the main supply.

Figure 7:
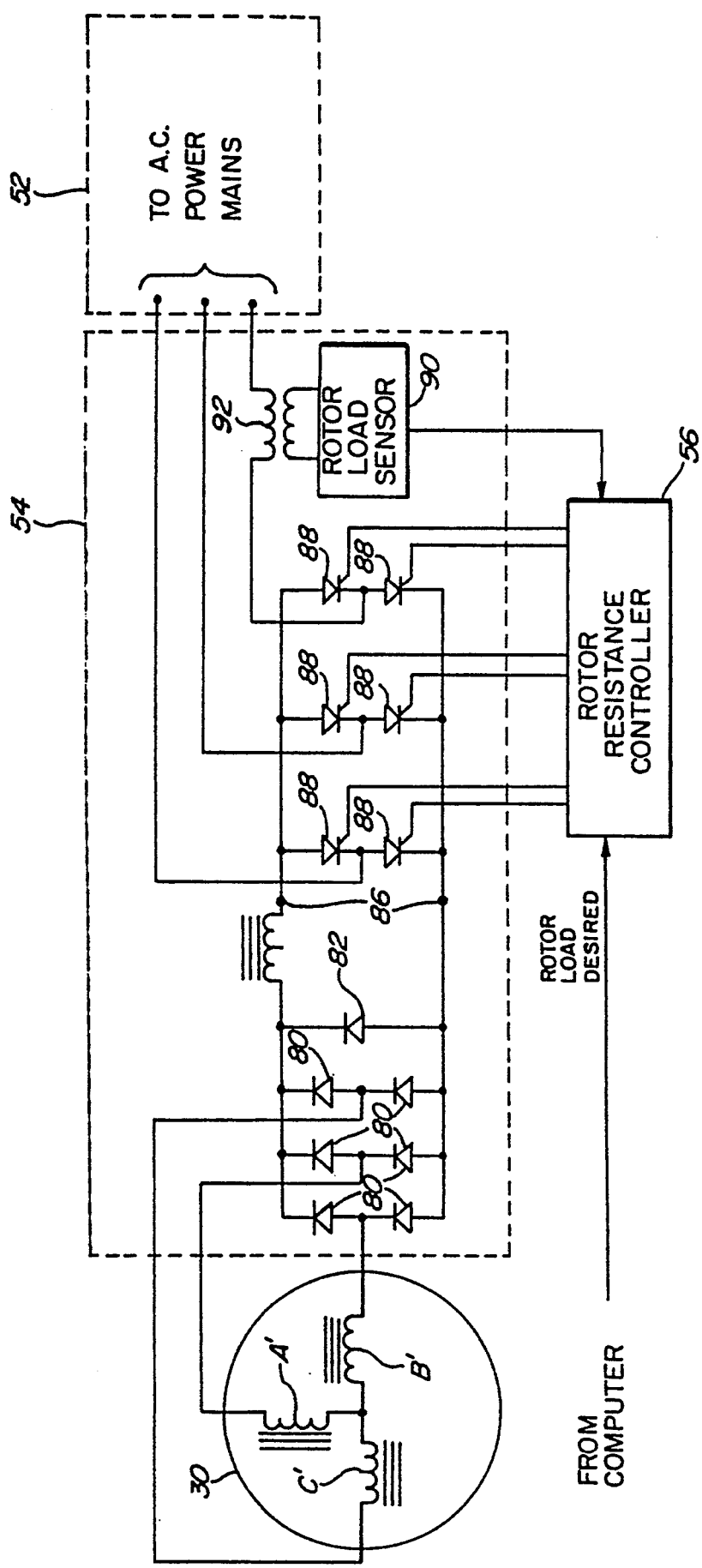
FIG. 7 is a schematic/block diagram of a regenerative rotor power control system which may be used with the dynamometer of FIGS. 1 and 2.

A regenerative system for controlling the effective rotor resistance is illustrated in FIG. 7. In this embodiment, the rotor current is first converted to d.c. via the rectifying diodes 80, inverse voltage protective diode 82 and filter inductor 84. The d.c. voltage appearing across terminal 86 is converted back to a.c. at the supply line frequency, e.g. 60 Hz, by SCRs 88 and fed back to the a.c. power mains through output terminals 90. The duty cycle of the SCRs 88 (i.e. percentage of on to off time) is controlled in accordance with the value of the rotor resistance desired as inputted to the rotor resistance controller 56 from the computer. Specifically the current fed back to the mains is measured by the current transformer 92 and a rotor load sensor 90 coupled to the transformer supplies a signal representative of the effective load or resistance across the rotor windings to the rotor resistance controller 56. This signal is compared with the desired rotor resistance signal to provide an error signal. The controller 56 controls the firing times of the SCRs to reduce the error signal to zero.

Figure 6:
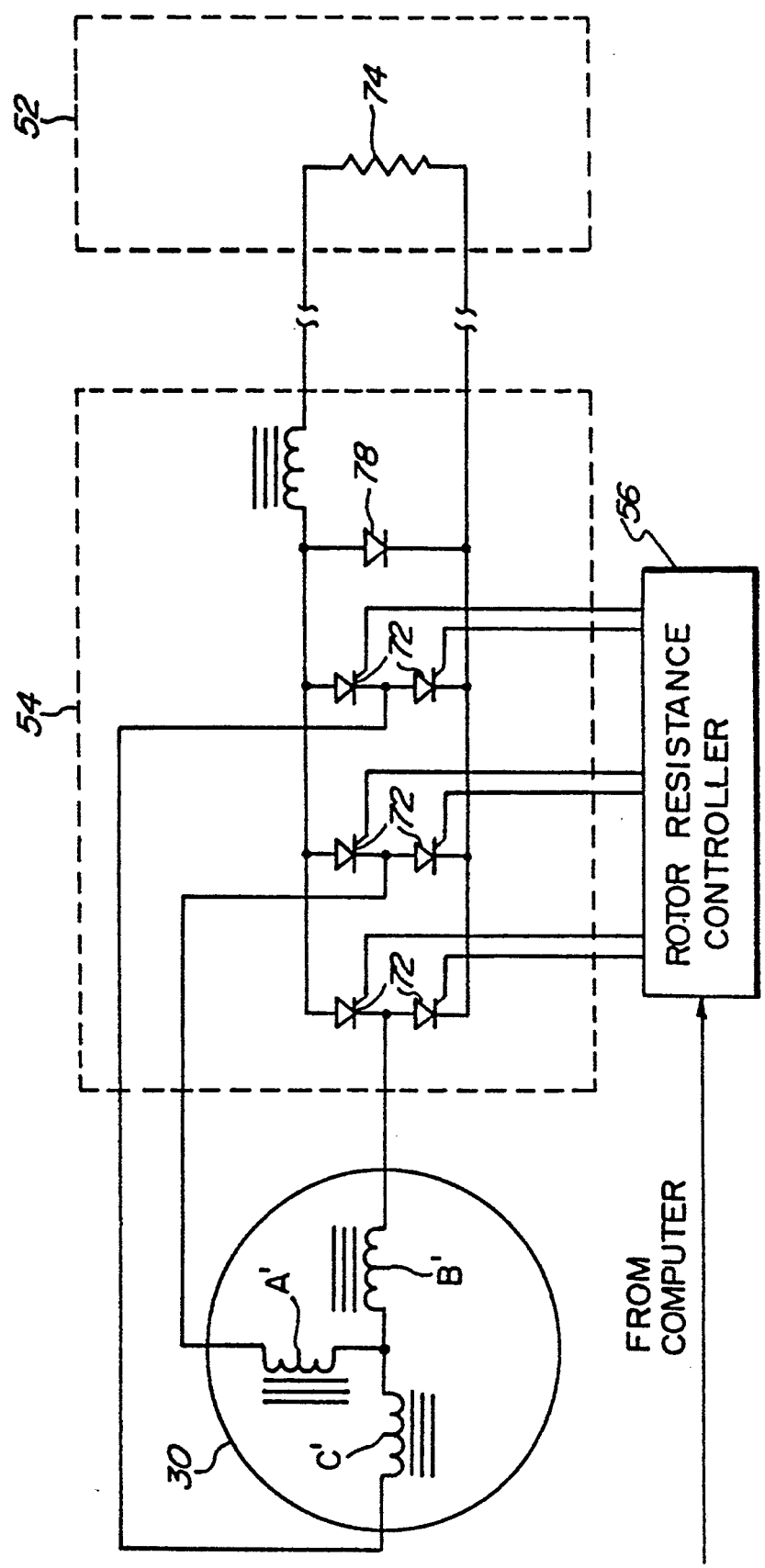
FIG. 6 is a schematic/block diagram of an alternative rotor power load and switching system.

The system of FIG. 7 conserves rotor slip energy by returning most of that energy back to the power mains. However, like the embodiment of FIG. 6, the rotor currents are not sinusoidal and the resulting harmonics are transformed through the motor to the mains supply.

In operation the dynamometer is initially operated without a test vehicle on the rolls for an appropriate period of time, say twenty minutes, to bring the bearings and other loss-generating parts up to operating temperature. The computer is then operated to generate and apply the second torque desired signal to the stator power controller 44 so that the stator power supply 46 applies the appropriate a.c. voltage(s) to the stator to drive the rotor and rolls at one or more selected speeds. The torque sensor measures the forces attributable to the parasitic losses at the selected speeds or during a coast down. A parasitic loss profile (i.e., torque vs. speed) is calculated from such data and stored in the computer. To provide the maximum starting torque while limiting rotor current for a wound rotor the rotor windings are connected to the maximum external resistance via the rotor power converter 54 and load 52 of one of the embodiments of FIGS. 5, 6 or 7. The external rotor resistance may be decreased gradually or as a step function as the rotor approaches synchronous speed.

The road load constants (equation 1) for the test vehicle may then be selected via the keyboard. The inertia to be simulated for the vehicle may also be selected at this time and inputted to the computer which in turn activates one or more of the clutches to couple the associated flywheels 18 to the shaft 22 so that the combined inertia of the coupled flywheels and other rotating components such as the rolls 12 approximates or approaches the selected inertia.

The flywheels (and other rotating components) alone may be relied upon to provide the simulated vehicle inertia so that the induction motor need only compensate for the parasitic losses and simulate the road load forces. In this case, the desired torque signal (first signal) applied to the stator power controller 44 from the computer 40 is representative of the road load forces and the parasitic loss forces.

Alternatively, the induction motor may be utilized to simulate all or part of the vehicle inertia. The selected portion of the vehicle inertia to be simulated may be inputted to the computer via the keyboard 42. The first desired torque signal will then be representative of (1) the parasitic loss forces (2) road load forces and (3) vehicle inertial forces (to be simulated by the induction motor). Any desired vehicle load/speed test sequence may be used in testing the vehicle with the test data being stored in the computer and displayed via a monitor or printer (not shown). As discussed previously, it is preferable to periodically update the parasitic loss profile by running the dynamometer in between vehicle tests.

There has been described a novel dynamometer and method for simulating vehicle road load and/or inertial forces which utilizes a variable speed induction motor and variable voltage a.c./d.c. power supplies for controlling the motor to absorb power from or supply power to the vehicle. Various modifications of the apparatus will occur to persons skilled in the art without involving any departure from the spirit and scope of the invention as defined in the appended claims.

What is claimed is:

1. A dynamometer for simulating the road load and/or inertial forces for motor vehicles having an engine for driving at least one driven wheel comprising:
    an induction motor having a stator and a rotor;
    means for coupling the induction motor to the engine or driven wheel of the vehicle;
    speed sensing means for providing a measured speed signal representative of the engine or wheel speed;
    force sensing means for providing a measured force signal representative of the force applied to or received from the engine or driven wheel of the vehicle by the motor minus the force attributable to any dynamometer parasitic losses;
    means responsive to the measured speed and/or measured force signal for providing a first desired torque signal representative of the torque desired to be applied to or received from the engine by the induction motor to similate the road load and/or inertial forces which will be encountered by the vehicle during actual operation and to compensate for forces attributable to the parasitic losses of the dynamometer;
    a source of variable magnitude a.c. voltage;
    a source of variable magnitude d.c. voltage;
    control means connected between the stator and the a.c. and d.c. voltage sources and responsive to the first desired torque signal for applying d.c. voltage to the stator and for controlling the magnitude of the voltage to brake the motor and cause the roll to absorb power from the engine or driven wheel when the first desired torque has a negative value and for applying a.c. voltage to the stator and for controlling the magnitude of the voltage to cause the motor to supply power to the roll when the first desired torque has a positive value in accordance with the value of the first desired torque signal; and
    means for providing a second desired torque signal representative of at least one speed at which the roll is to be driven for the measurement of the dynamometer parasitic losses and wherein the control means is further responsive to the second desired torque signal for applying a.c. voltage to the roll and controlling the magnitude of the voltage to cause the motor to supply power to the roll and drive the wheel at said at least one speed.

2. A dynamometer for simulating the road load and/or inertial forces for motor vehicles having an engine for driving at least one driven wheel comprising:
    a wound rotor induction motor having stator windings, rotor windings, and slip rings connected to the rotor windings;
    means for coupling the induction motor to the engine or driven wheel of the vehicle;
    speed sensing means for providing a measured speed signal representative of the engine or wheel speed;
    force sensing means for providing a measured force signal representative of the force applied to or received from the engine or driven wheel of the vehicle by the motor minus the force attributable to any dynamometer parasitic losses;
    means responsive to the measured speed and/or measured force signal for providing a first desired torque signal representative of the torque desired to be applied to or received from the engine by the induction motor to simulate the road load and/or inertial forces which will be encountered by the vehicle during actual operation and to compensate for forces attributable to the parasitic losses of the dynamometer;
    an external load having an effective resistance valve;
    means for connecting the slip rings to the external load;
    a source of variable magnitude a.c. voltage;
    a source of variable magnitude d.c. voltage;
    control means connected between the stator windings and the a.c. and d.c. voltage sources and responsive to the first desired torque signal for applying d.c. voltage to the stator windings and for controlling the magnitude of the voltage to brake the motor and cause the roll to absorb power from the engine or driven wheel when the first desired torque has a negative value and for applying a.c. voltage to the stator and for controlling the magnitude of the voltage to cause the motor to supply power to the roll when the first desired torque has a positive value in accordance with the value of the first desired torque signal.

3. The dynamometer of claim 2 including rotor resistance control means for varying the resistance value of the external load.

4. The dynamometer of claim 3 wherein the external load has two distinct resistance values.

5. The dynamometer of claim 4 wherein one of the resistance values is zero.

6. The dynamometer of claim 3 wherein the rotor resistance control means is arranged to continuously vary the resistance value of the external load between zero and a predetermined value.

7. The dynamometer of claim 6 wherein the external load includes a fixed value resistor associated with each rotor winding and the rotor resistance control means includes switching means for connecting the rotor windings to the fixed value resistors for a selected portion of each cycle of rotor current.

8. The dynamometer of claim 7 wherein the rotor resistance control means includes silicon controlled rectifiers connected across the rotor winding slip rings for selectively shorting out the fixed value resistors.

9. The dynamometer of claim 6 wherein the rotor resistance control includes regenerative means for supplying power generated in the rotor windings back to the a.c. source.

10. The dynamometer of claim 9 wherein the rotor resistance control means includes means for rectifying the rotor current, converting the rectified current to a.c. at the frequency of the a.c. source and applying the converted rotor a.c. to the a.c. source during selected portions of each cycle to thereby control the effective external load resistance.

11. The dynamometer of claim 2 wherein the a.c. source includes switching means for connecting the stator windings to an a.c. power main during a selected portion of each cycle of a.c. current.

12. The dynamometer of claim 11 wherein the switching means comprise a pair of silicon controlled rectifiers connected between each phase of the a.c.

power main and the associated phase winding of the stator.

13. The dynamometer of claim 11 wherein the induction motor is three phase.

14. The dynamometer of claim 13 wherein the d.c. source includes means connected to the a.c. power mains for providing a single phase output and further including switching means for selectively connecting separate phases of the stator windings to the single phase output during a selected portion of each cycle of a.c. current to supply d.c. current to the stator windings and to produce a stationary magnetic field.

15. The dynamometer of claim 14 wherein the stator phase windings are connected in a Y configuration, each phase winding having a terminal end and wherein the switching means comprises three silicon controlled rectifiers connected between the terminal end of each phase winding and the single phase output.

16. The dynamometer of claim 15 wherein the means for providing a single phase output comprises a transformer and wherein current of one polarity is supplied to two of the phase windings and current of the opposite polarity is applied to the other phase winding.

17. A dynamometer for simulating at least the road load and/or inertial forces for motor vehicles comprising:
 at least one roll adapted to engage at least one driven wheel of the vehicle;
 speed sensing means for providing a measured speed signal representative of the roll speed;
 force sensing means for providing a measured force signal representative of the force applied to or received from the driven wheel by the roll minus the force attributable to any dynamometer parasitic losses;
 an induction motor having a stator and a rotor;
 means for coupling the motor to the roll;
 means responsive to the measured speed and/or measured force signal for providing a first desired torque signal representative of the torque desired to be applied to or received from the roll by the motor to simulate the road load and/or inertial forces which will be encountered by the vehicle during actual operation and compensate for forces attributable to parasitic losses;
 a source of a.c. voltage;
 a source of d.c. voltage;
 control means connected between the stator and the a.c. and d.c. current sources and responsive to the first desired torque signal for applying d.c. voltage to the stator to brake the motor and cause the roll to absorb power from the wheel when the first desired torque has a negative value and for applying a.c. voltage to the stator to cause the motor to supply power to the roll when the first desired torque has a positive value whereby the force between the roll and the driven wheel will substantially equal the road load and/or inertial forces to be simulated by the induction motor.

18. The dynamometer of claim 17 wherein the induction motor is a class D motor.

19. The dynamometer of claim 18 wherein the induction motor is a wound rotor motor with slip rings connected to the rotor windings and further including means for connecting the slip rings to an external load having an effective resistance value.

20. The dynamometer of claim 19 including rotor resistance control means for varying the resistance value of the external load.

21. The dynamometer of claim 20 wherein the a.c. source includes switching means for connecting the stator windings to an a.c. power main during a selected portion of each cycle of a.c. current.

22. The dynamometer of claim 21 wherein the d.c. source includes means connected to the a.c. power mains for providing single phase output and further including switching means for selectively connecting separate phases of the stator windings to the single phase output during a selected portion of each cycle of a.c. current to supply d.c. current to the stator windings and produce a stationary magnetic field.

23. The dynamometer of claim 22 wherein the external load has two distinct resistance values.

24. The dynamometer of claim 23 wherein one of the resistance values is zero.

25. The dynamometer of claim 22 wherein the rotor resistance control means is arranged to continuously vary the resistance value of the external load between zero and a predetermined value.

26. The dynamometer of claim 25 wherein the rotor resistance control means includes a fixed value resistor associated with each rotor winding and switching means for connecting the rotor windings to the fixed value resistors for a selected portion of each cycle of rotor current.

27. The dynamometer of claim 25 wherein the rotor resistance control includes regenerative means for supplying power generated in the rotor windings back to the a.c. source.

28. The dynamometer of claim 27 wherein the rotor resistance control means includes means for rectifying the rotor current, converting to rectified current to a.c. at the frequency of the a.c. source and applying the converted rotor a.c. to the a.c. source during selected portions of each cycle to thereby control the effective external load resistance.

29. A method for operating a chassis dynamometer having at least one roll for engaging at least one driven wheel of a motor vehicle, a velocity encoder for providing a measured speed signal representative of the roll speed, a torque transducer for providing a measured torque signal representative of the force applied to or received from the driven wheel by the roll minus the force attributable to any dynamometer parasitic losses, and an induction motor having a stator and a rotor coupled to the roll comprising the steps of:
 a) generating a first desired torque signal representative of the torque desired to be applied to or received from the roll by the motor to simulate the road load and/or inertial forces anticipated to be encountered by the vehicle during on road operation and compensate for forces attributable to parasitic losses, the first desired torque signal having a positive value when power is to be supplied to the roll and a negative value when power is to be absorbed from the roll, respectively;
 b) generating a second desired torque signal representative of the torque desired to be applied to the roll by the motor to cause the motor to drive the roll at one or more selected speeds to enable the parasitic losses to be measured, the second desired torque signal having a positive value;
 c) supplying an a.c. voltage to the stator having a magnitude in accordance with the second desired torque signal to drive the rotor at the selected speed or speeds for the measurement of parasitic losses;

d) measuring and storing parasitic force signals representative of the forces attributable to the parasitic losses;

e) operating a motor vehicle with its driven wheel or wheels in engagement with the dynamometer roll;

f) supplying a d.c. voltage to the stator having a magnitude in accordance with the first desired torque signal when the first desired torque signal has a negative value to brake the motor and cause the motor to absorb power from the roll; and g) supplying a a.c. voltage to the stator having a magnitude in accordance with the first desired torque signal when the first desired torque signal has a positive value to cause the motor to supply power to the roll.

30. The method of claim 29 wherein the induction motor is of the wound rotor type with slip rings connected to the terminal ends of the rotor windings including the additional step of connecting an external resistance to the slip rings.

31. The method of claim 30 including the additional step of varying the value of the external resistance to provide a high rotor resistance at low rotor speeds and a low rotor resistance at high rotor speeds.

* * * * *

UNITED STATES PATENT AND TRADEMARK OFFICE
CERTIFICATE OF CORRECTION

PATENT NO. : 5,385,042

DATED : January 31, 1995

INVENTOR(S) : John T. La Belle

It is certified that error appears in the above-identified patent and that said Letters Patent is hereby corrected as shown below:

Column 4, line 51, "schematic block" should read --schematic/block--.

Column 5, line 49, "outes" should read --putes--.

Signed and Sealed this

Twenty-fifth Day of April, 1995

Attest:

BRUCE LEHMAN

Attesting Officer    Commissioner of Patents and Trademarks